United States Patent
Martin et al.

(10) Patent No.: US 8,639,438 B2
(45) Date of Patent: Jan. 28, 2014

(54) METHOD FOR VEHICLE DRIVING ASSISTANCE

(75) Inventors: Denis Martin, Clermont-Ferrand (FR); Jeremy Buisson, Saint-Saturnin (FR)

(73) Assignees: Compagnie Generale des Establissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/579,196

(22) PCT Filed: Feb. 25, 2011

(86) PCT No.: PCT/EP2011/052823
§ 371 (c)(1), (2), (4) Date: Sep. 18, 2012

(87) PCT Pub. No.: WO2011/104348
PCT Pub. Date: Sep. 1, 2011

(65) Prior Publication Data
US 2013/0006514 A1    Jan. 3, 2013

(30) Foreign Application Priority Data
Feb. 25, 2010 (FR) ........................ 10 51352

(51) Int. Cl.
*G01C 21/26* (2006.01)
(52) U.S. Cl.
USPC ........................................................ 701/400
(58) Field of Classification Search
USPC ........................................................ 701/400
See application file for complete search history.

(56) References Cited

U.S. PATENT DOCUMENTS

| 6,442,456 B2 * | 8/2002 | Burns et al. | 701/23 |
| 7,552,629 B2 * | 6/2009 | Regis et al. | 73/146 |

(Continued)

FOREIGN PATENT DOCUMENTS

| DE | 101 26 459 C1 | 1/2003 |
| DE | 101 54 591 A1 | 5/2003 |

(Continued)

OTHER PUBLICATIONS

International Search Report (PCT/ISA/210) issued on May 25, 2011, by the European Patent Office as the International Searching Authority for International Application No. PCT/EP2011/052823.

(Continued)

*Primary Examiner* — James Trammell
*Assistant Examiner* — Michael D Lang
(74) *Attorney, Agent, or Firm* — Dickinson Wright PLLC

(57) ABSTRACT

The invention relates to a method for assisting in the driving of a vehicle during a braking test on said vehicle on a track, said track being divided into a plurality of adjacent strips (Z1, . . . , Zn) mainly extending lengthwise in the track, the width (Iz) of each strip being greater than or equal to the width of the tires of the vehicle, each strip being worn on each braking of the vehicle on said strip. The assistance method comprises a step of selecting at least one strip out of the plurality of strips of the track, said strip being selected according to its level of wear. The assistance method also comprises a step of determining a theoretical trajectory of the vehicle, such that, by following said theoretical trajectory, the vehicle is able to brake on the selected strip.

8 Claims, 3 Drawing Sheets

(56) References Cited

U.S. PATENT DOCUMENTS

2009/0201140 A1   8/2009   Fargas et al.
2010/0019964 A1   1/2010   Huang et al.

FOREIGN PATENT DOCUMENTS

| | | |
|---|---|---|
| DE | 10 2006 026 436 A1 | 12/2007 |
| EP | 1 411 343 A2 | 4/2004 |
| EP | 1 460 409 A1 | 9/2004 |
| EP | 2 085 274 B1 | 7/2010 |
| FR | 2 902 909 A1 | 12/2007 |
| WO | WO 2010 019045 A1 | 2/2010 |

OTHER PUBLICATIONS

French Search Report issued on Oct. 28, 2010 for French Application No. 1051352.

R.N. Yong et al., "Road Surface Roughness and Tyre Performance", Journal of Terramechanics, vol. 27, No. 3 pp. 219-239, Jan. 1, 1990, XP-001150062.

B.N. J. Persson, "Theory of Ruber Frictin and Contact Mechanics", Journal of Chemical Physics, vol. 115, No. 8, Aug. 22, 2001, pp. 3840-3861, XP-008021245.

* cited by examiner

METHOD FOR VEHICLE DRIVING ASSISTANCE

FIELD OF THE INVENTION

The present invention relates to a method for assisting in the driving of a vehicle on a track.

The method of the invention has particular applications in assessing the performance characteristics of the tyres fitted on a passenger vehicle, a motorbike or a heavy goods vehicle.

STATE OF THE ART

A few years from now, labelling the performance characteristics of tyres will be mandatory. It will thus be easier for a customer to compare the quality of the tyres manufactured by the different manufacturers.

Three performance characteristics may be displayed. These performance characteristics relate to the grip on wet ground, the rolling resistance (which conditions the fuel consumption of the vehicle) and the noise emission level when rolling. It is thus planned to display, for the rolling resistance and the grip on wet ground, a score of between A and G, in which A corresponds to a high level of performance of the tyre and G to a low level of performance of the tyre. It is also planned to mention the performance of the tyre in terms of emitted noise, by a symbol representing a tyre with a loudspeaker and one or more wavefronts when the noise does not exceed, for example, 70 decibels.

Each tyre belongs to a tyre type and the tyres of one and the same type have the same levels of performance. Each type of tyre has an associated particular marking which is present on the sidewalls of the tyres (for example a DOT (Department of Transportation) marking). Thus, the tyres of one and the same type have the same marking.

To determine the level of performance of a type of tyre, it is possible to carry out tests on a test track.

The procedure for a test, for example a braking test, may be as follows: a passenger vehicle is fitted with four tyres of the same type, a driver makes the vehicle run on the track at a certain speed, the driver brakes and the distance travelled by the vehicle between two speed thresholds, for example between 80 km/h and 20 km/h, is measured. This measured distance is compared with a reference distance. This reference distance corresponds to the braking distance of a vehicle equipped with 4 reference tyres, for example four SRTT (standard reference test tyre) tyres. Based on the result of the comparison, it is thus possible to determine the grip performance of the tyre tested. A score between A and G is then assigned to the tyre based on its grip performance.

Generally, the means for measuring the braking distances are present on a determined portion of the track. This portion of the track may be divided into a plurality of adjacent strips arranged in the width of the track. Each strip may have a length of the order of 50 meters and a width of the order of 30 cm. It will be noted that the strips are not necessarily physically delimited on the track. In fact, this division of the track into adjacent strips may be purely theoretical and be applied, for example, by processing means of software means type.

During the test, each tyre brakes on a strip. Generally, the braking is rectilinear and the front left and rear left tyres brake on the same strip. Similarly, the front right tyre and the rear right tyre brake on the same strip.

By braking, the tyres wear the coating of the strips of the track. This may ultimately change the grip of the tyres on these strips.

The grip of a tyre on a strip here corresponds to a ratio of a tangential force (that is to say, a force exerted by the tyre parallel to the strip and on the axis of displacement of the vehicle) to a load applied to the tyre (that is to say, a force exerted perpendicularly relative to the strip on a vertical axis).

It is possible to carry out a large number of tests on a track. Thus, if a vehicle always runs on one and the same predetermined trajectory, it is always the same strips of the track which are worn. Ultimately, there may be a great difference in grip, for one and the same type of tyre, between worn strips on which numerous braking tests have been performed and less worn strips. Thus, according to the braking area (braking on a worn strip or braking on a less worn strip), there may be a difference in the assessment of the braking distances.

There is therefore a need to propose a method for assisting in the driving of a vehicle to limit the effects of the wear of the track on the assessment of the tyre performance characteristics.

BRIEF DESCRIPTION OF THE INVENTION

The invention relates to a method for assisting in the driving of a vehicle during a braking test on said vehicle on a track, said track being divided into a plurality of adjacent strips mainly extending lengthwise in the track, the width of each strip being greater than or equal to the width of the tyres of the vehicle, each strip being worn on each braking of the vehicle on said strip. The assistance method comprises a step of selecting at least one strip out of the plurality of strips of the track, said strip being selected according to its wear, a step of determining a theoretical trajectory of the vehicle, such that, by following said theoretical trajectory, the vehicle is able to brake on the selected strip.

For a first braking test, it is thus possible to determine a theoretical first trajectory. Thus, one or more first strip(s) of the track is/are worn by the braking of the vehicle.

For a second braking test, it is possible to determine a theoretical second trajectory different from the theoretical first trajectory. One or more second strip(s) of the track is/are then worn by the braking of the vehicle.

Thus, the wear of the track is controlled. The performance characteristic of the tyres is then improved.

For a first test category, the vehicle is a motorcycle and the selected strip is the strip that is the least worn out of the plurality of strips of the track.

For a second test category, the vehicle is a passenger vehicle and, prior to the selection step, pairs of strips are determined such that two strips of one and the same pair of strips are spaced apart from one another by a distance corresponding to the distance between two tyres of one and the same axle of the vehicle. For each pair of strips, a wear of the pair of strips corresponding to the average of the wears of the strips of said pair is determined and, in the selection step, the pair of strips which is the least worn out of the plurality of pairs of strips is selected.

Preferentially, the method comprises a step of indicating the theoretical trajectory to be followed by a driver of the vehicle.

Preferentially, the assistance method comprises a step of comparing a trajectory actually followed by the vehicle with the theoretical trajectory, to validate the braking test.

The validation or not of the test is thus automated. In the prior art, this validation was provided subjectively by the driver which could lead to interpretation errors. Thus, valid tests could be considered invalid by the driver and, conversely, invalid tests could be considered valid by said driver.

The invention makes the validation of the braking test more robust which improves the assessment of the performance characteristics of the tyres.

Another subject of the invention relates to a device for assisting in the driving of a motor vehicle during a braking test on a track.

Another subject of the invention relates to a computer program for assisting in the driving of a vehicle during a braking test on a track.

The invention also relates to the use of the method for assisting in the driving of a vehicle for the management of the state of a track on which braking tests on a vehicle are carried out.

BRIEF DESCRIPTION OF THE DRAWINGS

Other features and advantages of the invention will become apparent from the following description, given as a nonlimiting example, in light of the appended drawings in which.

In the following description, elements that are substantially identical or similar will be designated by the same references.

Figure 1:
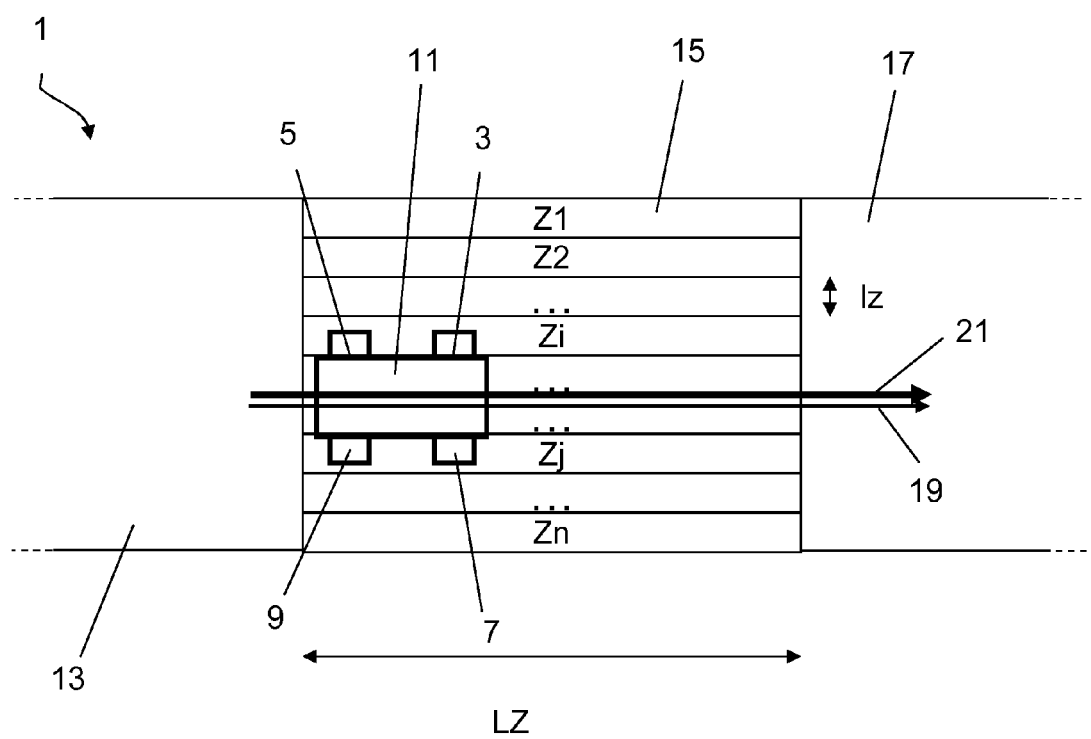
FIG. 1 represents a partial schematic view of a track on which braking tests are carried out.

FIG. 1 presents a partial schematic view of an example of a track 1 on which braking tests can be carried out on a vehicle 11. The vehicle 11 may be a passenger vehicle, a heavy goods vehicle, a motorcycle or an analytical vehicle, that is to say, a passenger vehicle or a heavy goods vehicle equipped with a trailer comprising test instruments.

The tyres 3, 5, 7, 9 of the vehicle 11 here belong to one and the same type of tyre. The tyres of one and the same type have the same performance characteristics. Each type of tyre has an associated particular marking present on a tyre sidewall (for example a DOT (Department of Transportation) marking). Thus, the tyres of one and the same type have the same marking.

In a variant embodiment, it is possible for the tyres situated at the front of the vehicle to belong to a first type of tyre and the tyres situated at the rear of the vehicle to belong to a second type of tyre different from the first type of tyre.

In another variant embodiment, the vehicle may comprise tyres belonging to four different types of tyre.

The track 1 comprises an acceleration portion 13 on which the vehicle 11 can pick up speed. The track 1 also comprises a test portion 15 on which the vehicle brakes. Finally, the track 1 comprises a return portion to enable the vehicle 11 to return over the acceleration portion 13 and over the test portion 15 in order to perform another braking test.

The test portion 15 has a determined coating, that is to say a coating comprising a determined macrotexture and a determined microtexture. It is possible, for example, to use a coating of polished concrete type having a smooth macrotexture and a smooth microtexture or a coating of sand mat type having a smooth macrotexture and a rough microtexture, or even a BBTM (very thin bituminous concrete) coating having a rough macrotexture and a more or less rough microtexture. Depending on the type of coating used, it is possible to recreate certain braking conditions, for example braking conditions on wet ground.

FIG. 1 presents a single test portion 15. Obviously, the track 1 may comprise a number of test portions, each of these test portions being able to have a different coating. It is thus possible to test the performance characteristics of the tyres 3, 5, 7, 9 on several types of coating.

The test portion 15 comprises a plurality of adjacent strips $Z_1, Z_2, \ldots, Z_i, \ldots, Z_j, \ldots, Z_n$, with $1 \le i < j \le n$ and n being any integer. The term strip should be understood to mean a rolling area having an overall rectangular form.

The adjacent strips mainly extend lengthwise in the track and the width of each strip is greater than or equal to the width of the tyres of the vehicle. As an example, the length $L_z$ of each strip is of the order of 50 meters and the width $I_z$ of each strip is approximately 30 cm. Obviously, it is possible to best adapt the width of the strips to the width of the tyres tested.

During a braking test, the vehicle follows a trajectory 19 and runs on certain strips of the track. In the example represented in FIG. 1, the vehicle runs on a first strip $Z_i$ and on a second strip $Z_j$.

The vehicle 1 is made to brake when the latter is in the test portion 15. Generally, the braking of the vehicle 1 is rectilinear and the front left tyre 3 and the rear left tyre 5 brake on the same strip, here the first strip $Z_i$. Similarly, the front right tyre 7 and the rear right tyre 9 brake on the same second strip, here the second strip $Z_j$.

During the braking, the tyres 3, 5, 7, 9 wear the strips $Z_i$, $Z_j$ by friction. For example, if the coating of the test portion 15 comprises stones which go beyond the surface of the strips, the braking of the vehicle 1 results in a polishing of said stones. The strips $Z_i$, $Z_j$ then become smoother which reduces the grip between the tyres of the vehicle 1 and the strips $Z_i$, $Z_j$ in new braking tests.

The grip of a tyre on a strip here corresponds to a ratio of a tangential force (that is to say, a force exerted by the tyre parallel to the strip and on the axis of displacement of the vehicle) to a load applied onto the tyre (that is to say, a force exerted perpendicularly relative to the strip on a vertical axis).

Figure 2:
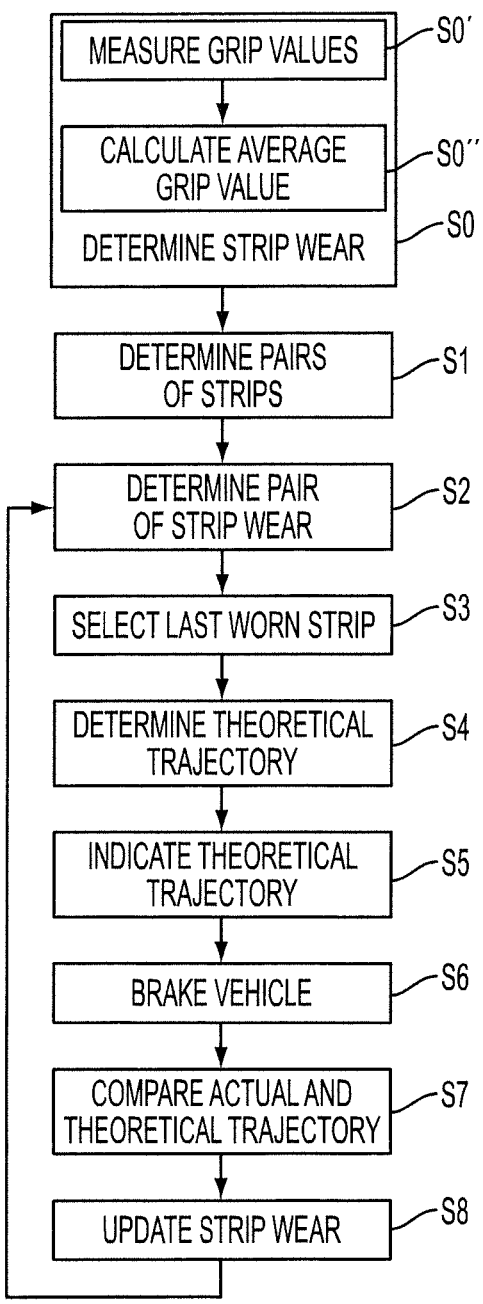
FIG. 2 represents a flow diagram of the steps of a method for assisting in the driving of a vehicle on the track of FIGS. 1.

FIG. 2 represents a flow diagram of the steps of a method for assisting in the driving of a passenger vehicle.

The assistance method comprises a step S0 of determining the wear for each strip $Z_1, Z_2, \ldots, Z_i, \ldots, Z_j, \ldots, Z_n$ of the track. This determination step S0 comprises a substep S0' for measuring grip values at different points of one and the same strip and a substep S0" for statistically processing the duly measured grip values.

The substep S0' for measuring grip values is here performed using a grip measuring appliance, for example an appliance of "Griptester" type and, in the substep S0", the average of the grip values of the different points of one and the same strip is calculated. This duly calculated average corresponds to the wear of the strip. Thus, the greater the average of the grip values, the less the strip is worn. Conversely, the lower the average of the grip values, the more the strip is worn.

This step S0 of determining the wear can be performed periodically in time. In a variant embodiment, the wear of each strip $Z_1, Z_2, \ldots, Z_i, \ldots, Z_j, \ldots, Z_n$ is known and the determination step S0 is not necessary.

The assistance method also comprises a step S1 of determining pairs of strips such that two strips of one and the same pair of strips are spaced apart from one another by a distance corresponding to the distance between two tyres of one and the same axle of the passenger vehicle.

The assistance method also comprises a step S2 of determining a wear for each pair of strips corresponding to the average of the wears of the strips of said pair.

The assistance method then comprises a step S3 of selecting the pair of strips which is the least worn out of the plurality of pairs of strips. In the example of FIG. 1, the pair of strips selected comprises the strip $Z_i$ and the strip $Z_j$.

In a step S4, a theoretical trajectory 21 of the vehicle is determined such that, by following this theoretical trajectory, the vehicle runs on the strips Zi and Zj.

In a step S5, the theoretical trajectory to be followed is indicated to the driver.

In a step S6, the vehicle brakes on the strips Zi and Zj and, in a step S7, the trajectory 19 actually followed by the vehicle is compared with the theoretical trajectory 21 in order to validate or not the braking test.

The assistance method may also comprise a step S8 of updating the wear of the strips Zi, Zj to take account of the effects of the braking on these strips.

It will be noted that it is possible to repeat the steps S2 to S8 on each braking test.

Obviously, it is possible to retain an identical theoretical trajectory 21 for a number of successive braking tests. In these conditions, only the steps S5 to S8 are repeated.

Figure 3:
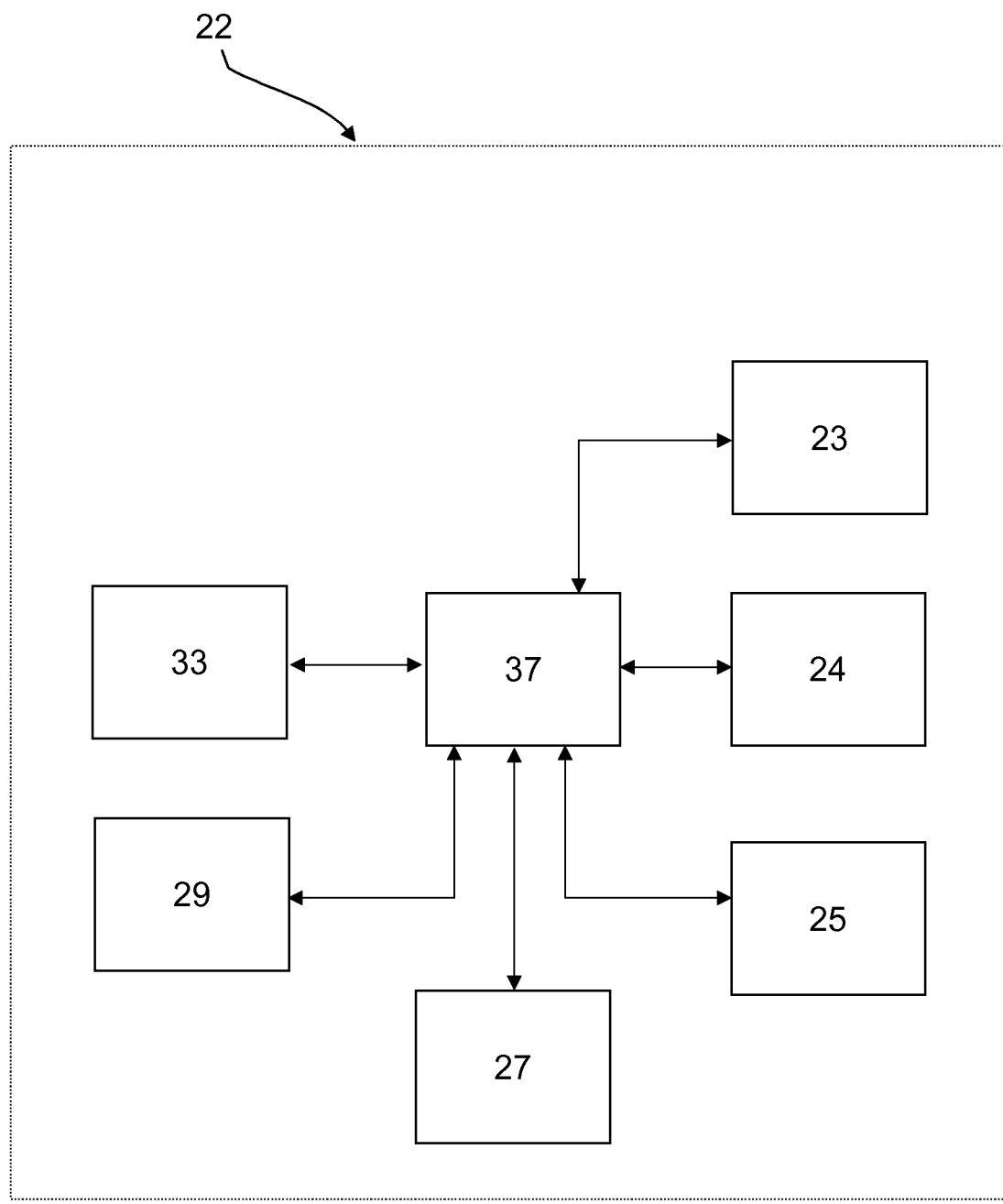
FIG. 3 represents a device for assisting in the driving of a vehicle for implementing the assistance method of FIG. 2.

There now follows a description, with reference to FIG. 3, of a device 22 for assisting in the driving of a vehicle.

The assistance device comprises:
- a module 23 for determining pairs of strips;
- a module 24 for determining a wear for each pair of strips;
- a module 25 for selecting a pair of strips Zi, Zj;
- a module 27 for determining a theoretical trajectory 21;
- a module 29 for indicating the theoretical trajectory 21;
- a module 33 for comparing the theoretical trajectory 21 with the trajectory 19 actually followed by the vehicle;
- a control unit 37.

The module 23 is able to determine pairs of strips such that two strips of one and the same pair are spaced apart from one another by a distance corresponding to the distance between two tyres of one and the same axle of the vehicle. This determination is made on the basis of data relating to the vehicle which are stored in the module 23.

The module 24 is designed to determine a wear for each pair of strips. This wear here corresponds to the average of the wears of the two strips belonging to the pair of strips.

The module 25 is designed to select the pair of strips which is the least worn out of the plurality of pairs of strips.

The module 27 is designed to determine the theoretical trajectory 21 on the basis of the strips Zi, Zj of the pair of strips selected. The theoretical trajectory 21 is thus determined on the basis of mapping data of the various strips of the track stored in the module 27.

The module 29 is designed to indicate the theoretical trajectory to be followed by the driver. This indication module 29 comprises, for example, a GPS (global positioning system) making it possible to give the position of the vehicle at each instant. By comparing this GPS position with the theoretical trajectory 21, it is possible to determine whether the vehicle deviates or not from said theoretical trajectory. The GPS is, for example, compatible with the RTK (real time kinematic) technology. The indication module 29 may also comprise a display screen and/or a loudspeaker to indicate, visually or auditorily, the theoretical trajectory that the driver should follow at each instant.

The module 33 is able to compare the trajectory actually followed by the vehicle with the theoretical trajectory once the braking has been carried out.

The control unit 37 is connected to the module 23 for determining pairs of strips, to the module 24 for determining a wear for each pair of strips, to the module 25 for selecting a pair of strips, to the module for determining a theoretical trajectory, to the module 29 for indicating the theoretical trajectory, to the module 33 for comparing trajectories.

The function of the control unit 37 is to control the operation of these different modules 23, 24, 25, 27, 29, 33.

In the example described here, the modules 23, 24, 25, 27, 29, 33 are software means. The invention therefore also relates to a computer program comprising instructions for implementing a method for assisting in the driving implemented by the assistance device 22 when the program is run by a processor present in the control unit 37. This program may be stored in or transmitted by an information medium. This may be a hardware storage medium, for example a CD-ROM, a magnetic diskette or a hard disk, or even a transmissible medium such as an electrical, optical or radio signal.

It will be noted that the vehicle also comprises braking means for braking the vehicle on the selected strips.

These braking means may be actuated directly by the driver of the vehicle. In a variant embodiment, these braking means may be actuated automatically by the control unit 37.

The invention also relates to the use of the assistance method described above for the management of the state of the track on which braking tests are carried out. A portion of this assistance method may be implemented in a control centre managing the operation of a number of tracks. Thus, the step of determining the theoretical trajectory may be carried out in such a control centre. The characteristics of the theoretical trajectory may then be transmitted to the vehicle located on the track. This transmission may be done, for example, by an electrical, optical or radio signal.

The invention claimed is:

1. A method for assisting a driver in the driving of a vehicle during a braking test of said vehicle on a test track to evaluate performance characteristics of one or more tires on said vehicle,
    wherein the test track comprises an acceleration portion and a test portion, and wherein the test portion is divided into a plurality of adjacent strips (Z1, . . . , Zn) mainly extending lengthwise in the track, the width (Iz) of each strip being greater than or equal to the width of the tires of the vehicle, such that each strip is worn by tires of the vehicle during each braking of the vehicle on said strip, such that the wear of each strip affects the assessment of tire performance characteristics,
    said assistance method comprising:
        selecting at least one strip out of the plurality of strips of the track, according to the known or determined wear of that strip;
        determining a theoretical trajectory of the vehicle, such that, by following said theoretical trajectory, the vehicle can be braked on the selected strip
        indicating the theoretical trajectory to be followed to the driver of the vehicle; and
        braking the vehicle and measuring performance characteristics of the tires on said vehicle.

2. The assistance method according to claim 1, wherein the vehicle is a motorcycle, and wherein the selecting at least one strip from the plurality of strips of the track comprises selecting the strip with the least wear.

3. The assistance method according to claim 1, wherein the vehicle is a passenger vehicle and further comprising, prior to the selecting of at least one strip, determining pairs of strips, such that two strips of one and the same pair of strips are spaced apart from one another by a distance corresponding to the distance between two tires of one and the same axle of the vehicle, wherein for each pair of strips, a wear of the pair of strips corresponding to the average of the wears of the strips of said pair is determined for each pair of strips and, wherein the selecting of at least one strip comprises selecting the pair of strips from the plurality of pairs of strips with the least wear.

4. The assistance method according to claim 1, further comprising comparing a trajectory actually followed by the vehicle with the theoretical trajectory, thereby validating the braking test.

5. A method for managing the state of a track on which braking tests of a vehicle are carried out, comprising:
performing the assistance method according to claim 1, wherein the indicating of the theoretical trajectory to the driver comprises transmitting the theoretical trajectory to the vehicle located on the test track.

6. A device for assisting in the driving of a vehicle during a braking test on said vehicle on a track, said track being divided into a plurality of adjacent strips (Z1, ..., Zn) mainly extending lengthwise in the track, the width (Iz) of each strip being greater than or equal to the width of the tires of the vehicle, each strip being worn on each braking of the vehicle on said strip, said assistance device comprising:
a module for selecting at least one strip out of the plurality of strips of the track, said strip being selected according to its wear; and
a module for determining a theoretical trajectory of the vehicle, such that, by following said theoretical trajectory, the vehicle is able to brake on the selected strip.

7. A non-transitory computer readable medium comprising a computer program for assisting a driver in the driving of a vehicle during a braking test of said vehicle on a test track to evaluate the performance characteristics of one or more tires on said vehicle,
wherein the test track comprises an acceleration portion and a test portion, and wherein the test portion is divided into a plurality of adjacent strips (Z1, ..., Zn) mainly extending lengthwise in the track, the width (Iz) of each strip being greater than or equal to the width of the tires of the vehicle, such that each strip is worn on-by tires of the vehicle during each braking of the vehicle on said strip, such that the wear of each strip affects the assessment of tire performance characteristics, said computer program comprising instructions for implementing the following:
selecting at least one strip out of the plurality of strips of the track, said strip being selected according to its wear; and
determining a theoretical trajectory of the vehicle, such that, by following said theoretical trajectory, the vehicle is able to brake on the selected strip.

8. A method for assisting a driver in the driving of a vehicle during a braking test of said vehicle on a test track to evaluate performance characteristics of one or more tires on said vehicle,
wherein the test track comprises an acceleration portion and a test portion, and wherein the test portion is divided into a plurality of adjacent strips (Z1, ..., Zn) mainly extending lengthwise in the track, the width (Iz) of each strip being greater than or equal to the width of the tires of the vehicle, such that each strip is worn by the tires of the vehicle each braking of the vehicle on said strip, such that the wear of each strip affects the assessment of tire performance characteristics, said assistance method comprising:
selecting at least one strip out of the plurality of strips of the track, using a module for selecting a strip according to its wear; and
determining a theoretical trajectory of the vehicle using a module for determining a theoretical trajectory, such that, by following said theoretical trajectory, the vehicle is able to brake on the selected strip.

\* \* \* \* \*